(12) United States Patent
Lin et al.

(10) Patent No.: US 9,103,966 B2
(45) Date of Patent: Aug. 11, 2015

(54) PLASTIC OPTICAL FIBER COMPRISING CYCLIC BLOCK COPOLYMER

(75) Inventors: Thomas S. Lin, Whippany, NJ (US);
Anny Flory, South Plainfield, NJ (US);
Dirk B. Zinkweg, Flemington, NJ (US);
Jeffrey M. Cogen, Flemington, NJ (US);
Mary Anne Leugers, Midland, MI (US);
Weijun Zhou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 433 days.

(21) Appl. No.: 13/514,162

(22) PCT Filed: Nov. 3, 2010

(86) PCT No.: PCT/US2010/055249
§ 371 (c)(1),
(2), (4) Date: Jun. 6, 2012

(87) PCT Pub. No.: WO2011/075229
PCT Pub. Date: Jun. 23, 2011

(65) Prior Publication Data
US 2012/0243842 A1    Sep. 27, 2012

(51) Int. Cl.
*G02B 6/00*    (2006.01)
*G02B 1/04*    (2006.01)
*G02B 6/02*    (2006.01)

(52) U.S. Cl.
CPC ............ *G02B 1/046* (2013.01); *G02B 6/02033* (2013.01)

(58) Field of Classification Search
None
See application file for complete search history.

(56) References Cited

U.S. PATENT DOCUMENTS

| | | | |
|---|---|---|---|
| 3,333,024 A | 7/1967 | Haefele et al. | |
| 4,196,154 A | 4/1980 | Tung et al. | |
| 4,200,718 A | 4/1980 | Tung et al. | |
| 4,798,445 A | 1/1989 | Yamamoto et al. | |
| 4,810,055 A | 3/1989 | Suganuma et al. | |
| 4,999,141 A | 3/1991 | Ueno et al. | |
| 5,352,744 A | 10/1994 | Bates et al. | |
| 5,446,095 A | 8/1995 | Siol et al. | |
| 5,580,932 A | 12/1996 | Koike | |
| 5,599,897 A | 2/1997 | Nishiguchi et al. | |
| 5,612,422 A | 3/1997 | Hucul et al. | |
| 5,645,253 A | 7/1997 | Hoshino | |
| 6,147,180 A * | 11/2000 | Markel et al. | 526/352 |
| 6,815,475 B2 | 11/2004 | Donald et al. | |
| 7,512,309 B2 | 3/2009 | Aoyagi et al. | |
| 2002/0061981 A1 | 5/2002 | Donald et al. | |
| 2003/0119971 A1 | 6/2003 | Donald et al. | |
| 2011/0146792 A1* | 6/2011 | Wu et al. | 136/259 |

FOREIGN PATENT DOCUMENTS

| | | |
|---|---|---|
| EP | 0171294 | 2/1986 |
| EP | 0264818 | 4/1988 |
| EP | 1189988 | 12/2000 |
| JP | H02-238403 A | 9/1990 |
| JP | H11-189614 A | 7/1999 |
| JP | 2003240964 | 8/2003 |
| JP | 2006133337 | 5/2006 |
| JP | 2006200004 | 8/2006 |
| WO | 2010096106 | 8/2010 |

OTHER PUBLICATIONS

International Search Report mailed Jan. 13, 2011 for PCT App. No. PCT/US2010/055249.

\* cited by examiner

*Primary Examiner* — Tina Wong
(74) *Attorney, Agent, or Firm* — Whyte Hirschboeck Dudek S.C.

(57) ABSTRACT

Plastic optical fibers or plastic optical fiber cores with good high temperature resistance to optical attenuation loss are prepared from a cyclic block copolymer characterized by a: A. Weight ratio of hydrogenated conjugated diene polymer block to hydrogenated vinyl aromatic polymer block of 35:65 to 10:90; B. Number average molecular weight (Mn) of from 40,000 to 150,000, grams per mole (g/mol); and C. Hydrogenation level such that each hydrogenated vinyl aromatic polymer block and each hydrogenated conjugated diene polymer block has a hydrogenation level of at least 95 percent.

15 Claims, No Drawings

PLASTIC OPTICAL FIBER COMPRISING CYCLIC BLOCK COPOLYMER

FIELD OF THE INVENTION

This invention relates to plastic optical fiber (POF). In one aspect the invention relates to POF made from cyclic block copolymers (CBC) while in another aspect, the invention relates to CBC compositions used to make the POF. In yet another aspect the invention relates to the use of such POF in automotive, industrial, medical and consumer applications.

BACKGROUND OF THE INVENTION

Plastic optical fibers have been used for transmitting optical signals, particularly for short span applications (e.g., 100 meters or less). They are advantaged over glass fibers in terms of easy handling, light weight and good ductility. POF are also easier to splice to each other and to the light source because of their large core diameter and high numerical aperture. Furthermore, plastic optical fiber generally costs less in manufacturing than glass fibers.

Polymeric materials suitable for use as the core of plastic optical fibers must possess a set of stringent property requirements such as excellent transparency and low optical loss, good thermal stability, good chemical stability, and flexibility for bending, etc. In addition, polymers should be amendable to typical fiber spinning process for making optical fibers. Recent advances for various polymers investigated for POF can be found in a monograph entitled "Polymers for Lightwave and Integrated Optics", Marcel Dekker, Inc (1992), by Lawrence A. Hornak. Traditionally, poly(methyl methacrylate) (PMMA) has been the primary choice of material for manufacturing the core of a plastic optical fiber. However, PMMA tends to absorb moisture that can deteriorate signal strength (or increase attenuation). Furthermore, PMMA does not provide adequate resistance to temperatures in excess of 85° C. At temperatures above 85° C., the optical loss in a PMMA plastic optical fiber will increase to an undesirable level.

Many applications require a plastic optical fiber with heat resistance to temperatures in excess of 85° C. and some applications, e.g., automotive, require heat resistance up to 125° C. A high heat performance POF is thus very desirable. There has been a considerable amount of research devoted to developing new optical materials other than PMMA that are suitable for plastic optical fiber use at temperatures in excess of 100° C. For example, U.S. Pat. No. 5,599,897 teaches high temperature plastic optical fiber compositions using aromatic polycarbonate. U.S. Pat. No. 4,798,445 teaches high temperature plastic optical fiber compositions using polycarbonate made with a melt spinning production process. U.S. Pat. No. 4,999,141 and EP 0,264,818 B1 teach high temperature plastic optical fiber compositions using silicone rubber and electron beam irradiation crosslinking process. EP 0,171,294 B1 teaches high temperature plastic optical fiber compositions using PMMA exposed to electron beam irradiation. U.S. Pat. No. 4,810,055 teaches high temperature plastic optical fiber compositions made from aliphatic N-substituted maleimide as a monomer unit and methyl methacrylate and/or styrene monomers. U.S. Pat. No. 7,512,309 teaches a polymer composition comprising 5 to 100% by mass of a unit (A) of a lactone compound and 0 to 95% by mass of a unit (B) of methacrylate as constitutional units for plastic optical fiber with good heat resistance and transparency.

Specifically, polycarbonate, amorphous cyclic olefin polymer (COP) or cyclic olefin copolymer (COC) and aliphatic N-substituted maleimide have been proposed for POF use. However, none of these materials can fully satisfy the performance requirements of POF. Polycarbonate, as taught in JP 06-200004, has large optical loss due to light scattering from non-uniformity in density and impurity in the polymer. COP or COC contain alicyclic groups in their main chain and show high heat resistance (JP 04-365003), but they also suffer issues such as difficulty in completely removing impurities. Further, cyclic olefin materials tend to be brittle and lack bending flexibility. As for aliphatic N-substituted maleimide such as described in U.S. Pat. No. 4,810,055, processing of the material into fiber is found to be challenging. Moreover, the approaches of polycarbonate and maleimide are potentially susceptible to moisture absorption which is detrimental for signal transmission.

U.S. Pat. No. 6,815,475 teaches compositions comprising a hydrogenated block copolymer have a multitude of uses including films, profiles, sheets, pultruded articles, fibers, coated articles, injection molded articles and blow or rotational molded articles. The compositions comprise a fully or substantially fully hydrogenated, rigid block copolymer that has at least two distinct blocks of hydrogenated, polymerized vinyl aromatic monomer and one block of hydrogenated, polymerized conjugated diene monomer. The hydrogenated diene block(s) and the hydrogenated vinyl aromatic blocks are present in a weight ratio of 40:60 or less.

SUMMARY OF THE INVENTION

In one embodiment the invention is a plastic optical fiber core comprising, preferably consisting essentially of, a cyclic block copolymer characterized by a:
  A. Weight ratio of hydrogenated conjugated diene polymer block to hydrogenated vinyl aromatic polymer block of 35:65 to 10:90, preferably of 30:70 to 10:90 and more preferably of 30:70 to 15:85;
  B. Number average molecular weight (Mn) of from 40,000 to 150,000, preferably 50,000 to 90,000 and more preferably 60,000 to 90,000, grams per mole (g/mol); and
  C. Hydrogenation level such that each hydrogenated vinyl aromatic polymer block and each hydrogenated conjugated diene polymer block has a hydrogenation level of at least 95, preferably at least 98 and more preferably at least 99, percent.

In one embodiment the cyclic block copolymer is prepared by substantially fully hydrogenating a vinyl aromatic and conjugated diene block copolymer.

In one embodiment the invention is a plastic optical fiber having a core-cladding configuration in which the core comprises, preferably consists essentially of, a cyclic block copolymer characterized by a:
  A. Weight ratio of hydrogenated conjugated diene polymer block to hydrogenated vinyl aromatic polymer block of 35:65 to 10:90, preferably of 30:70 to 10:90 and more preferably of 30:70 to 15:85;
  B. Number average molecular weight (Mn) of from 40,000 to 150,000, preferably 50,000 to 90,000 and more preferably 60,000 to 90,000, g/mol; and
  C. Hydrogenation level such that each hydrogenated vinyl aromatic polymer block and each hydrogenated conjugated diene polymer block has a hydrogenation level of at least 95, preferably at least 98 and more preferably at least 99, percent.

In one embodiment the invention is the plastic optical fiber core further comprising an outer cladding layer with a refractive index lower, e.g., at least 0.012 lower, than that of the core. In one embodiment the invention is the plastic optical fiber core further characterized by a change in attenuation between 105° C. and 25° C. of not more than one decibel per meter (dB/m) measured at a wavelength of 650 nanometers (nm).

In one embodiment the cyclic block copolymer from which the plastic optical fiber core is made is further characterized by at least one, preferably at least two, more preferably at least three and even more preferably at least four, of (D) a glass transition temperature of at least 120° C., (E) a tensile modulus greater than 1380 kilopascals (kPa) (200,000 pounds per square inch (psi)), and (F) a room temperature (23° C.) un-notched Izod impact toughness of at least 110 Joules per meter (J/m) (2 foot-pounds per inch (ft-lb/in.)).

In one embodiment the invention is an automotive, industrial, medical or consumer system comprising a plastic optical fiber core as described above.

DETAILED DESCRIPTION OF THE PREFERRED EMBODIMENT

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numbers and numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.01, 0.1, 1.1, etc.), one unit is considered to be 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions are defined.

"Comprising", "including", "having" and like terms are not intended to exclude the presence of any additional component, step or procedure, whether or not the same is specifically disclosed. In order to avoid any doubt, all compositions claimed through use of the term "comprising" may include one or more additional component substances, parts and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" and like terms mean a macromolecular compound prepared by reacting (i.e., polymerizing) monomers of the same or different type. "Polymer" includes homopolymers and interpolymers.

"Interpolymer", "copolymer" and like terms mean a polymer prepared by the polymerization of at least two different monomers. These generic terms include classical copolymers, i.e., polymers prepared from two different monomers, and polymers prepared from more than two different monomers, e.g., terpolymers, tetrapolymers, etc.

"Olefin-based polymer" and like terms means a polymer containing a majority weight percent of units derived from one or more olefin monomers, for example ethylene or propylene. Nonlimiting examples of olefin-based polymers include ethylene-based polymers, propylene-based polymers and ethylene/propylene-based polymers.

"Block" as used in the context of this invention means a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32-38.

Cyclic Block Copolymer

Cyclic block copolymer (CBC) is prepared from substantially fully hydrogenating a vinyl aromatic/conjugated diene block copolymer. Prior to hydrogenation, the vinyl aromatic/conjugated diene block copolymer may have any known architecture, including distinct block, tapered block, and radial block. Distinct block structures that include alternating vinyl aromatic blocks and conjugated diene blocks yield preferred results, especially when such block structures yield triblock copolymers or pentablock copolymers, in each case with vinyl aromatic end blocks. Pentablock copolymers constitute particularly preferred block copolymers. The vinyl aromatic blocks may have the same or different molecular weights as desired. Similarly, the conjugated diene blocks may have the same or different molecular weights.

Typical vinyl aromatic monomers include styrene, alpha-methylstyrene, all isomers of vinyl toluene (especially para-vinyl toluene), all isomers of ethyl styrene, propyl styrene, butyl styrene, vinyl biphenyl, vinyl naphthalene, vinyl anthracene and the like, or mixtures thereof. The block copolymers can contain one or more than one polymerized vinyl aromatic monomer in each vinyl aromatic block. The vinyl aromatic blocks preferably comprise styrene, more preferably consist essentially of styrene, and still more preferably consist of styrene.

The conjugated diene blocks may comprise any monomer that has two conjugated double bonds. Illustrative, but non-limiting, examples of conjugated diene monomers include butadiene, 2-methyl-1,3-butadiene, 2-methyl-1,3-pentadiene, isoprene, or mixtures thereof. As with the vinyl aromatic blocks, the block copolymers may contain one (for example, butadiene or isoprene) or more than one (for example, both butadiene and isoprene). Preferred conjugated diene polymer blocks in the block copolymers may, prior to hydrogenation, comprise polybutadiene blocks, polyisoprene blocks or mixed polybutadiene/polyisoprene blocks. While a block copolymer may, prior to hydrogenation, include one polybutadiene block and one polyisoprene block, preferred results follow with block copolymers that, prior to hydrogenation, have conjugated diene blocks that are solely polybutadiene blocks or solely polyisoprene blocks. A preference for a single diene monomer stems primarily from manufacturing simplicity. In both cases, the microstructure of diene incorporation into the polymer backbone can be controlled to achieve a CBC polymer that is substantially or fully amorphous.

Illustrative preferred vinyl aromatic/conjugated diene block copolymers wherein each vinyl aromatic block comprises styrene (S) and each conjugated diene block comprises butadiene (B) or isoprene (I) include SBS and SIS triblock copolymers and SBSBS and SISIS pentablock copolymers. While the block copolymer may be a triblock copolymer or, more preferably a pentablock copolymer, the block copolymer may be a multiblock that has one or more additional vinyl aromatic polymer blocks, one or more additional conjugated diene polymer blocks or both one or more additional vinyl aromatic polymer blocks and one or more additional conjugated diene polymer blocks, or a star block copolymer (for example, that produced via coupling). One may use a blend of two block copolymers (for example, two triblock copolymers, two pentablock copolymers or one triblock copolymer and one pentablock copolymer) if desired. One may also use two different diene monomers within a single block, which would provide a structure that may be shown as, for example, SIBS. These representative structures illustrate, but do not limit, block copolymers that may be suitable for use as the first polymer in an embodiment of this invention.

"Substantially fully hydrogenated" means that at least 95 percent of the double bonds present in vinyl aromatic blocks prior to hydrogenation are hydrogenated or saturated and at least 97 percent of double bonds present in diene blocks prior to hydrogenation are hydrogenated or saturated. By varying the relative length of the blocks, total molecular weight, block architecture (e.g., diblock, triblock, pentablock, multi-armed radial block, etc) and process conditions, various types of nanostructure morphology can be obtained from this block copolymer and thereby modify the optical properties of the major phase. Specific, non-limiting examples include lamellar morphology, bi-continuous gyroid morphology, cylinder morphology, and spherical morphology, etc. The morphology and microphase separation behavior of a block copolymer is well known and may be found, for example, in The Physics of Block Copolymers by Ian Hamley, Oxford University Press, 1998. Particularly preferred CBC polymers are those having an amount of styrene from 65 wt % to less than 90 wt % and an amount of conjugated diene from more than 10 wt % to 35 wt %, prior to hydrogenation.

Number average molecular weight (Mn) and weight average molecular weight (Mw) can both be used to describe the CBC. Because these polymers tend to have very narrow molecular weight polydispersities, the difference between Mn and Mw is minimal. The ratio of Mw to Mn is typically 1.1 or less. In fact, in some cases the number average molecular weight and the number average molecular weight will be virtually the same. As such, Mn can also be read as Mw throughout this application.

Methods of making block copolymers are well known in the art. Typically, block copolymers are made by anionic polymerization, examples of which are cited in Anionic Polymerization: Principles and Practical Applications, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pp. 307-331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl)benzene treated with organolithium compounds, as described in U.S. Pat. Nos. 4,200,718 and 4,196,154.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024). Additionally, soluble, homogeneous catalysts such those prepared from combinations of transition metal salts of 2-ethylhexanoic acid and alkyl lithiums can be used to fully saturate block copolymers, as described in Die Makromolekulare Chemie, Volume 160, pp. 291, 1972. The copolymer hydrogenation can also be achieved using hydrogen and a heterogeneous catalyst such as those described in U.S. Pat. Nos. 5,352,744, 5,612422 and 5,645,253.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclo-octane, cycloheptane, dodecane, dioxane, diethylene glycol dimethyl ether, tetrahydrofuran, isopentane, decahydronaphthalene or mixtures of two or more such solvents, with cyclohexane being the most preferred.

Typical hydrogenation temperatures are from 40° C., preferably from 100° C., more preferably from 200° C., and most preferably from 120° C. to 250° C., preferably to 200° C., more preferably to 180° C., and most preferably to 170° C. The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.

"Level of hydrogenation" and like terms means the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

In one embodiment the composition comprises a hydrogenated block copolymer of a vinyl aromatic and a conjugated diene in which the block copolymer is a penta-block copolymer comprising three blocks of hydrogenated vinyl aromatic polymer and two blocks of conjugated diene polymer. The hydrogenated penta-block copolymer comprises less than 90 weight percent hydrogenated vinyl aromatic polymer blocks, based on the total weight of the hydrogenated block copolymer, and has an aromatic and diene hydrogenation level of at least 95 percent.

Plastic Optical Fiber

Plastic optical fibers have a core-cladding configuration, the core material, e.g., a polymer having a higher refractive index and superior light transmitting properties, covered with a cladding material, e.g., a transparent polymer having a lower refractive index. In one embodiment the cladding comprises at least one of a (i) substantially fully hydrogenated vinyl aromatic block copolymer with fluorine modification, (ii) cyclic olefin polymer, and (iii) fluorine modified cyclic olefin copolymer. The cladding material provided on the outer periphery of the core is not restricted to a single layer, and it may comprise two or more layers. The configuration may comprise a core/clad structure in which a central shaft-like core is surrounded by a clad with lower index of refraction than the core; or it may be a multi-core with a sea-island structure in which island portions comprising plural cores or core/clad structures are interspersed in a sea portion comprising a clad. The configuration is not restricted to these examples. Other configurations of plastic optical fiber include multi-core step index fiber, microstructured fibers, Bragg fibers, hole-assisted fibers, and graded index fibers. These constructions can be found in the book by O. Ziemann, J Krauser, P. E. Zamzow, and W. Daum, "POF Handbook: Optical Short Range Transmission Systems," $2^{nd}$ Edition, Springer-Verlag, Berlin, 2008.

The clad component of the optical fiber may be properly selected from fluorine-containing olefin resins, fluorinated methacrylate polymers, a silicone resin, poly(4-methyl-1-pentene), ethylene-vinyl acetate, and the like. Examples of such resins include tetrafluoroethylene/hexafluoropropylene copolymer, tetrafluoroethylene-/perfluoroalkyl vinyl ether copolymer, ethylene/tetrafluoroethylene, Teflon® AF manufactured by E.I. du Pont de Nemours & Co. Inc, CYTOP manufactured by Asahi Glass Co., Ltd., and THVP 2030G, THV 220A and THV 500G manufactured by Dyneon. The cladding layer may also be formed by coating the CBC core with fluorinated CBC. Furthermore, the cladding layer can also be formed by directly fluorinating the surface of core made with CBC.

The fluorine-containing olefin resins used for the clad preferably include a tetrafluoroethylene (TFE) unit. Examples of such fluorine-containing olefin resins may include: terpolymer consisting of 10 to 60% by mass of a vinylidene fluoride (VdF) unit, 20 to 70% by mass of the TFE unit, and 5 to 35% by mass of a hexafluoropropylene (HFP) unit; terpolymer consisting of 5 to 25% by mass of the VdF unit, 50 to 80% by mass of the TFE unit, and 5 to 25% by mass of a perfluoro(fluoro)alkyl vinyl ether unit; a tetrapolymer consisting of 10 to 30% by mass of the VdF unit, 40 to 80% by mass of the TFE unit, 5 to 40% by mass of the HFP unit and 0.1 to 15% by mass of the perfluoro(fluoro)alkyl vinyl ether unit; a bipolymer consisting of 40 to 90% by mass of the TFE unit and 10 to 60% by mass of the perfluoro(fluoro)alkyl vinyl ether unit; a bipolymer consisting of 30 to 75% by mass of the TFE unit and 25 to 70% by mass of the HFP unit; and the like.

The plastic optical fiber may comprise a protective layer on its outer periphery. Examples of materials for the protective layer include, without limitation, the materials for cladding materials mentioned above such as a copolymer of VdF and TFE; a copolymer of VdF, TFE and HFP; a copolymer of VdF, TFE, HFP, and a perfluoro(fluoro)alkyl vinyl ether; a copolymer of VdF, TFE, and a perfluoro(fluoro)alkyl vinyl ether; a copolymer of ethylene, TFE, and HFP; a copolymer of TFE and HFP; or a copolymer of VdF, TFE, and hexafluoroacetone. The protective layer may be formed on a core/clad structure by a coating method or a dipping method. The protective layer may also be formed in conjunction with a core and a clad by extrusion with a conjugate fiber spinning nozzle.

Both the core and cladding material can comprise one or more dopants, e.g., nano-size titanium dioxide, $ZrO_2$, CuO, or $SiO_2$ particles, or an organic dye such as bromobenzene, benzyl n-butyl phthalate, diphenyl sulfate, triphenyl phosphate, benzyl benzoate, etc., to modify its refractive index. Both the core and cladding material can also comprise one or more other additives, e.g., antioxidants, UV-stabilizers, etc. The dopants and additives are used in known amounts and in known manners.

One example of a method for manufacturing a plastic optical fiber is forming the core and then applying a solution of the cladding material by any conventional coating or dipping technique. The solution typically comprises the cladding material dissolved in a solvent such as ethyl acetate, dimethylformamide or dimethylacetamide. Another example of a method for manufacturing an optical fiber is the extrusion by a conjugate spinning method with a conjugate fiber spinning nozzle to form an optical fiber in which the core is coated with its cladding material. The plastic optical fiber can also be manufactured through a co-extrusion process with one core extruder and one clad extruder based on commonly known art described in the book by O. Ziemann, J Krauser, P. E. Zamzow, and W. Daum, "POF Handbook: Optical Short Range Transmission Systems," $2^{nd}$ Edition, Springer-Verlag, Berlin, 2008. If desired, the CBC core can be exposed to irradiation to crosslink the CBC to further increase its heat resistance.

An external coating layer may be provided on the outer periphery of the clad of the plastic optical fiber or on the outer periphery of a protective layer to improve the abrasion, heat, moisture and flame resistance of the optical fiber. The coating layer may be, for example depending on environment in which the optical fiber is used, one or a mixture of two or more materials selected from the group consisting of polyamide resins, polyethylene resins, polypropylene resins, moisture-crosslinked polyethylene resins, moisture-crosslinked polypropylene resins, polyvinylidene chloride resins, chlorinated polyethylene resins, polyurethane resins, vinylidene fluoride resins, and various UV or ultraviolet curing resins. The coating layer does not contact directly with the core. This external coating material can also contain various ingredients such as antioxidants, processing aids, UV stabilizers, flame retardants, etc.

The invention is described more fully through the following example. Unless otherwise noted, all parts and percentages are by weight.

SPECIFIC EMBODIMENT

Materials

Resins A-1, A-2, CR-1 and CR-2 are CBC materials. They are prepared by sequential anionic polymerization of styrene and a conjugated diene in cyclohexane as a solvent. Sequential polymerization is conducted by preparing a cyclohexane solution of a first purified monomer (e.g. styrene) required to complete a first polymer block, heating the solution to the polymerization temperature, and adding an alkyl lithium initiator. Polymerization proceeds until the monomer is exhausted, after which time a second purified monomer (e.g. a conjugated diene) is added and polymerization continues until the second monomer is exhausted. This process is repeated by alternating the first and second monomers until the block copolymer sequence (e.g. triblock or pentablock) is realized, after which the polymerization is terminated with an acidic species such as an alcohol, effectively protonating a living or chain end of the block copolymer sequence and producing a lithium salt as a by-product.

A-1 is a pentablock copolymer with a pre-hydrogenation styrene content of 85 wt % and butadiene content of 15 wt %, a pre-hydrogenation number average molecular weight (Mn) of 75,000 g/mol, a pre-hydrogenation 1,2-vinyl content of 10 wt %.

A-2 is a pentablock copolymer with a pre-hydrogenation styrene content of 70 wt % and butadiene content of 30 wt %, a pre-hydrogenation number average molecular weight (Mn) of 75,000 g/mol, a pre-hydrogenation 1,2-vinyl content of 8 wt %.

CR-1 is a pentablock copolymer with a pre-hydrogenation styrene content of 90 wt % and isoprene content of 10 wt %, a pre-hydrogenation number average molecular weight (Mn) of 65,000 g/mol, a pre-hydrogenation 1,2-vinyl content of 10 wt %.

CR-2 is a pentablock copolymer with a pre-hydrogenation styrene content of 60 wt % and butadiene content of 40 wt %, a pre-hydrogenation number average molecular weight (Mn) of 68,000 g/mol, a pre-hydrogenation 1,2-vinyl content of 8 wt %.

CR-3 is a cyclic olefin copolymer commercially available from Ticona under the trade designation of TOPAS™ 5013.

CR-4 is a polymethylmethacrylate resin commercially available from Arkema under the trade designation of Plexiglas V825.

The glass transition temperature ($T_g$) of cyclic block copolymers (A-1, A-2, CR-1 and CR-2) and the cyclic olefin copolymer (Material CR-3) are determined by Differential Scanning Calorimetry (DSC) at a scan rate of 10° C./min and report values using a second heat scan.

Molecular weight analysis of fully hydrogenated vinyl aromatic-conjugated diene block copolymer, post hydrogenation, is measured using a high temperature GPC instrument (Polymer Laboratories, Inc. model PL210) equipped with a differential refractive index detector (PL210 DRI), a viscometer (Viscotek™ model PL210-R) and a dual angle laser light scattering detector (Precision Detectors, Inc. model PD2020). Polymer Laboratories Plgel Olexis columns are used to perform the GPC separation. The columns are calibrated using narrow molecular weight distribution polystyrene standards (Polymer Laboratories, Inc.). The instruments are operated at a set point temperature of 145° C. and use 1,2,4-trichlorobeneze, stabilized with approximately 100 parts by weight per million parts by weight of 1,2,4-trichlorobenzene (ppm) of 2,6-di-tert-butyl-4-methylphenol, as a carrier solvent. Samples are prepared in 1,2,4-trichlorobenzene (stabilized with 200 ppm 2,6-di-tert-butyl-4-methylphenol) at a concentration of 1.0 mg/mL. The samples are dissolved by heating in an oven operating at a set point temperature of 160° C. for one hour. Sample bottles are agitated by hand every 20 minutes. Once dissolved, a 1.8 mL aliquot of sample solution is transferred by a hot glass pipette to an injection vial for the PL210 system. Two injections vials from each sample bottle are filled. An injection of 200 microliters (µL) from each vial is made onto the chromatographic system. Number average (Mn) or weight average molecular weight (Mw) of hydrogenated block copolymers (post-hydrogenation) are reported as polystyrene-equivalent values.

Un-notched Izod impact at room temperature is measured in accord with ASTM D-256. An un-notched Izod (UNI) of 110 J/m (2 ft-lb/in) or more equals good. Specimens used for un-notched Izod impact testing are cut out at a length of 2.5 inches (6.4 cm) and a width of 0.5 inch (1.3 cm) from injection molded tensile bars of 0.125 inch (0.3 cm) thickness.

Tensile modulus is measured at room temperature in accord with ASTM D-638 using 0.125 inch (0.3 cm) thickness tensile bars. Tensile specimens are injection molded at a melt temperature of 250° C. and mold temperature of 38° C.

Melt viscosity of polymers is measured at 250° C. using a parallel plate rheometer, e.g., ARES rheometer manufactured by TA Instruments. The complex shear viscosity ($\eta^*$) is measured at an oscillatory frequency of 1 rad/s. A compression molded disk of 25 mm diameter and approximate 2 mm thickness is used for measurement of complex shear viscosity $\eta^*$. Experimental procedures for measuring complex shear viscosity are well known in the art and can be found in a monograph such as Rheology: Principles, Measurements, and Applications, by Christopher W. Macosko (VCH, 1994).

Refractive index of materials is measured on compression molded films of approximately 150 micron (µm) thickness using an ABBE refractometer (Atago D2). The index of refraction is measured at sodium D line at 25° C.

The refractive index of each core material is 1.51, and each core is coated with a fluoropolymer with a lower refractive index than the core material. As a control an optical fiber core is also made from PMMA Plexiglas V825 available from Arkema, and the PMMA has a refractive index of 1.49. The key properties of A through E polymers are shown in Table 1

TABLE 1

Materials and Properties

| CBC | Mn (g/mole) | Styrene (wt %) | Diene | Tg (° C.) | Viscosity (Pa-s) | Modulus (kpsi) | UNI (J/m) |
|---|---|---|---|---|---|---|---|
| A-1 | 75,000 | 85 | Butadiene | 127.3 | $1.6 \times 10^3$ | 348 | 123 |
| A-2 | 75,000 | 70 | Butadiene | 122.8 | $7.1 \times 10^3$ | 246 | 208 |
| CR-1 | 65,000 | 90 | Isoprene | 112.3 | 80 | 369 | 75 |
| CR-2 | 68,000 | 60 | Butadiene | 121.7 | $1.6 \times 10^5$ | 176 | 667 |
| CR-3 | nm | n/a | n/a | 130 | nm | nm | 80 |
| CR-4 | nm | n/a | n/a | 118 | nm | nm | nm |

(nm—not measured; n/a: not applicable)

The optical fibers are made in a co-extrusion process using two extruders with a ¾ inch, 24:1 aspect ratio screw for both core and cladding materials. Both extruders are enclosed in a Class 1000 clean-room. The polymers (cladding/core) meet at a die block with independent temperature control that is designed to form the polymer melts in a bi-component sheath-core structure. The optical fiber has a 1 mm diameter with 25 micron cladding thickness. A-1, CR-1 and CR-3 optical fibers are extruded at 233° C. die temperature. A-2 and CR-2 optical fiber are extruded at 244° C. die temperature. Plexiglas V825 (CR-4) optical fiber is extruded at 214° C.

The measurement of attenuation requires light transmission of a known wavelength through a fiber while measuring changes in intensity over distance. The conventional method, known as the "cutback method", involves coupling fiber to a light source and measuring the power output at the other end. Then the test fiber is cut near the source and power re-measured. By knowing the power at the source and at the end of the fiber, as well as the length of the fiber, the attenuation coefficient can be determined by a calculation using the following equation. Optical loss in decibels (dB) for a fiber of length L is given by:

$$a(dB) = -\frac{10}{L}\log(I/I_0)$$

where $I_o$ and I are the power of input and output light respectively. This "cutback method" is employed to measure attenuation for the fibers. For example, the light intensity transmitted by a 6 meters (m) length of POF is measured, a value recorded, and then cut to a 2 m length, which is also measured. The difference between the 6 m and 2 m values are then divided by the difference in the length, or 4 m, giving the final loss per meter. The instrument used to measure optical attenuation is a Fotec Mini Test Kit 701 consisting of a light source (S760) and detector (M702A). The M702A uses a silicon photodiode detector and the S760 has a LED at 665 nanometers (nm). The photo detector is set to read measurements at 650 nm.

The optical loss per meter or attenuations (dB/m) of the optical fiber cores are measured at room temperature (about 25° C.), 85° C., 95° C., 105° C., and 125° C. after the optical fiber cores are equilibrated for 10 minutes at the set temperature of the oven. The temperature stability of the attenuation of the core is assessed by taking the difference between the attenuation measured at the set temperature and the attenuation measured at room temperature. Table 2 reports the attenuation differences ($\Delta\alpha$) at elevated temperatures versus at room temperature for each plastic optical fiber sample. The results demonstrate that the attenuation changes for A-1 and A-2 are significantly smaller than that of CR-4 up to 125° C. Also A-1 shows very good attenuation stability over A-2 up to 105° C.

TABLE 2

Attenuation Difference $\Delta\alpha$ (dB/m)

| Ex/Comp Ex | Material | Fiber Spinning Process | $\Delta\alpha$ (85-25° C.) | $\Delta\alpha$ (95-25° C.) | $\Delta\alpha$ (105-25° C.) | $\Delta\alpha$ (125-25° C.) |
|---|---|---|---|---|---|---|
| 1 | A-1 | Good | −0.11 | −0.09 | 0.07 | 1.74 |
| 2 | A-2 | Good | 0.08 | 0.13 | 0.60 | 1.00 |
| A | CR-1 | fiber prone to breakage | nm | nm | nm | nm |
| B | CR-2 | difficult to process, fiber not completely transparent | nm | nm | nm | nm |
| C | CR-3 | fiber prone to breakage | nm | nm | nm | nm |
| D | CR-4 | Good | 0.33 | 0.83 | 1.18 | 2.11 |

Results in Table 2 demonstrate that only a preferred range of CBC compositions are suitable for manufacturing high temperature plastic optical fibers. When the modulus of CBC is too high such as in Comp Ex A, the material is very brittle. Fiber spinning process is difficult and the fiber is too brittle to be of practical use. When the modulus of CBC is too low such as in Comp Ex B, the material typically has an excessively high viscosity, which renders difficulty in fiber spinning. In fact, the fiber prepared from CR-2 material is not even completely transparent due to extrusion related defects on the surface of the plastic optical fiber core.

By comparing Examples 1 and 2 and Comp Ex C, the advantage of block copolymer design versus a random copolymer (i.e., cyclic olefin copolymer CR-3) for plastic optical fiber use is clear.

Results in Table 2 also demonstrate a superior performance of CBC plastic optical fibers (Examples 1 and 2) relative to PMMA optical fiber (Comp Ex D) in terms of improved heat resistance.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A plastic optical fiber core comprising a cyclic block copolymer characterized by a:
   A. Weight ratio of hydrogenated conjugated diene polymer block to hydrogenated vinyl aromatic polymer block of 35:65 to 10:90;
   B. Number average molecular weight (Mn) of from 40,000 to 150,000 g/mol;
   C. Hydrogenation level such that each hydrogenated vinyl aromatic polymer block and each hydrogenated conjugated diene polymer block has a hydrogenation level of at least 95 percent;
   D. Tensile modulus greater than 1380 kilopascals (kPa) (200,000 pounds per square inch (psi)); and
   E. Room temperature (23° C.) un-notched Izod impact toughness of at least 110 Joules per meter (J/m) (2 foot-pounds per inch (ft-lb/in.)).

2. The plastic optical fiber core of claim 1 in which the cyclic block copolymer is further characterized by a glass transition temperature of at least 120° C.

3. The plastic optical fiber core of claim 2 further comprising a cladding over and in contact with the core, the core and cladding each having a refractive index, the refractive index of the cladding different from the refractive index of the core.

4. The plastic optical fiber core of claim 3 in which the refractive index of the cladding is at least 0.012 lower than the refractive index of the core.

5. The plastic optical fiber core of claim 4 in which the cladding comprises at least one of a fluorine-containing olefin resin, a fluorinated methacrylate polymer, a silicone resin, poly(4-methyl-1-pentene) and an ethylene-vinyl acetate.

6. The plastic optical fiber core of claim 4 in which the cladding comprises at least one of a (i) substantially fully hydrogenated vinyl aromatic block copolymer with fluorine modification, (ii) cyclic olefin polymer, and (iii) fluorine modified cyclic olefin copolymer.

7. The plastic optical fiber core of claim 1 in which the cyclic block copolymer is further characterized a change in attenuation between 105° C. and 25° C. of not more than 1 dB/m measured at a wavelength of 650 nm.

8. The plastic optical fiber core of claim 7 in which the cyclic block copolymer, prior to hydrogenation, has at least one block comprising a conjugated diene and at least two blocks comprising a vinyl aromatic monomer.

9. The plastic optical fiber core of claim 8 in which the vinyl aromatic polymer block comprises units derived from at least one of styrene and alpha-methylstyrene.

10. The plastic optical fiber core of claim 9 in which the styrenic block copolymer, prior to hydrogenation, is a styrene-butadiene-styrene-butadiene-styrene pentablock copolymer.

11. The plastic optical fiber core of claim 10 in which the polymerized vinyl aromatic content of the cyclic block copolymer, prior to hydrogenation, is from 70 to 85 wt %, each weight percent being based upon total block copolymer weight prior to hydrogenation.

12. The plastic optical fiber core of claim 11 in which the number average molecular weight (Mn) of the cyclic block copolymer is from 50,000 to 90,000 g/mol.

13. The optical fiber core of claim 12 in which the
  A. Weight ratio of hydrogenated conjugated diene polymer block to hydrogenated vinyl aromatic polymer block of 30:70 to 15:85;
  B. Number average molecular weight (Mn) of from 60,000 to 90,000 g/mol; and
  C. Hydrogenation level such that each hydrogenated vinyl aromatic polymer block and each hydrogenated conjugated diene polymer block has a hydrogenation level of at least 98 percent.

14. An automotive, industrial, medical or consumer system comprising the plastic optical fiber core of claim 13.

15. A plastic optical fiber comprising a core-cladding configuration in which the core comprises a cyclic block copolymer characterized by a:
  A. Weight ratio of hydrogenated conjugated diene polymer block to hydrogenated vinyl aromatic polymer block of 35:65 to 10:90;
  B. Number average molecular weight (Mn) of from 40,000 to 150,000 g/mol;
  C. Hydrogenation level such that each hydrogenated vinyl aromatic polymer block and each hydrogenated conjugated diene polymer block has a hydrogenation level of at least 95 percent; and
  D. Tensile modulus greater than 1380 kilopascals (kPa) (200,000 pounds per square inch (psi)).

* * * * *